United States Patent
Ueda et al.

(10) Patent No.: US 7,342,366 B2
(45) Date of Patent: Mar. 11, 2008

(54) CONTROLLER FOR BRUSHLESS MOTOR

(75) Inventors: Takeshi Ueda, Kashiba (JP); Shigeki Nagase, Nabari (JP)

(73) Assignee: Jtekt Corporation, Osaka (JP)

( * ) Notice: Subject to any disclaimer, the term of this patent is extended or adjusted under 35 U.S.C. 154(b) by 122 days.

(21) Appl. No.: 11/321,293

(22) Filed: Dec. 21, 2005

(65) Prior Publication Data
US 2006/0132083 A1 Jun. 22, 2006

(30) Foreign Application Priority Data
Dec. 21, 2004 (JP) ............................. 2004-369448

(51) Int. Cl.
*H02P 1/18* (2006.01)
(52) U.S. Cl. .............. 318/254; 318/431; 318/437; 318/599; 318/727; 180/446; 702/183
(58) Field of Classification Search ............. 318/727, 318/432, 434, 700, 437, 254, 439, 431, 599; 180/446; 701/41, 43; 702/183
See application file for complete search history.

(56) References Cited

U.S. PATENT DOCUMENTS

| 6,639,379 | B2* | 10/2003 | Matsushita et al. | 318/727 |
|---|---|---|---|---|
| 6,694,287 | B2* | 2/2004 | Mir et al. | 702/183 |
| 6,719,089 | B2* | 4/2004 | Yoneda et al. | 180/446 |
| 6,810,986 | B2* | 11/2004 | Takagi | 180/446 |
| 6,836,090 | B2* | 12/2004 | Sugiyama et al. | 318/437 |
| 7,023,158 | B2* | 4/2006 | Hirono | 318/431 |
| 7,126,304 | B2* | 10/2006 | Suzuki | 318/599 |
| 2003/0046028 | A1* | 3/2003 | Mir et al. | 702/183 |
| 2003/0057913 | A1* | 3/2003 | Matsushita et al. | 318/727 |
| 2003/0062868 | A1* | 4/2003 | Mir et al. | 318/599 |
| 2003/0106738 | A1* | 6/2003 | Yoneda et al. | 180/446 |
| 2003/0178245 | A1* | 9/2003 | Takagi | 180/446 |
| 2004/0155613 | A1* | 8/2004 | Sugiyama et al. | 318/254 |

FOREIGN PATENT DOCUMENTS

JP 64-028072 1/1999

\* cited by examiner

*Primary Examiner*—Paul Ip
(74) *Attorney, Agent, or Firm*—Jordan and Hamburg LLP

(57) ABSTRACT

The controller for a brushless motor controls motor current by executing updates of applied voltage to a coil in accordance with rotational position of a rotor, the target current, and the actual current flowing through the coil. The updates of applied voltage to the coil are executed according to the results of calculations of applied voltage to the coil in accordance with the rotational position of the rotor, the target current, and the actual current flowing through the coil, in order to generate power for rotating the rotor by varying magnetic field generated by the coil. The cycle time of the updates of applied voltage is shorter than the cycle time of the calculations of applied voltage corresponding to the rotational position of the rotor.

4 Claims, 9 Drawing Sheets

Prior Art

Prior Art

CONTROLLER FOR BRUSHLESS MOTOR

FIELD OF THE INVENTION

The present invention relates to a controller for a brushless motor, which controls motor current in accordance with rotational position of a rotor, target current, and actual current flowing through a motor coil.

DESCRIPTION OF THE RELATED ART

For example, a controller for a brushless motor for generating steering assist power in an electric power steering device comprises a target current calculation part which calculates the target current in accordance with a detected steering condition, a rotational position detection part which detects the rotational position of a rotor, a current detection part which detects the actual current flowing through the coil for generating magnetic field, an applied voltage calculation part which calculates applied voltage to the coil in a set cycle time in accordance with the calculated target current, the detected rotational position, and the detected actual current, and a drive circuit which executes updates of applied voltage to the coil in accordance with the results of calculations by the applied voltage calculation part. In such a controller for a brushless motor, it is intended to shorten the time interval from the input of the steering condition until the output of the target current in order to reduce oscillations, by shortening the cycle time of the calculations of the target current between the detections of steering condition. (See Japanese Patent Application Laid-Open No. S64-28072).

SUMMARY OF THE INVENTION

In the controller described above, a calculation loop of the applied voltage to the coil is provided separately from a calculation loop of the target current, and the cycle time of the calculations of applied voltage to the coil is made shorter than the time interval from the input of the steering condition until the output of the target current in order to control the motor current precisely. However, the cycle time of the calculations of applied voltage to the coil is limited depending not only on the calculation time but also on the rotational position of the rotor and the time for detecting the actual current, thus there is a limitation in shortening the cycle time of the calculations of applied voltage. Therefore, the cycle time of the calculations of applied voltage is set to approximately 200 μsec. Since the motor current is varied according to the cycle time of the calculations of applied voltage corresponding to the rotational position of the rotor, noise problem is generated with noise peak having frequency nearly equal to the inverse of the cycle time of the calculations of applied voltage, when the shortening of the cycle time of the calculations of applied voltage is limited. Particularly, since the variation of the motor current according to the cycle time of the calculations of applied voltage becomes large when the rotor rotates at high speed, the problem becomes more significant. An object of the present invention is to provide a controller for a brushless motor which can resolve such a problem described above.

The present invention is a controller for a brushless motor, which executes updates of applied voltage to a coil according to results of calculations of applied voltage to the coil in accordance with rotational position of a rotor, target current, and actual current flowing through the coil, in order to generate power for rotating the rotor by varying magnetic field generated by the coil, wherein the cycle time of the updates of applied voltage is set shorter than the cycle time of the calculations of applied voltage.

In the prior art, the cycle time of the updates of applied voltage to the coil was made equal to the cycle time of the calculations of applied voltage.

In the present invention, on the other hand, a determination loop of the applied voltage to the coil is provided separately from a calculation loop of the applied voltage to the coil, and the cycle time of the updates of applied voltage to the coil is made shorter than the cycle time of the calculations of applied voltage. Therefore, variation of current flowing through the coil according to the cycle time of the updates of applied voltage can be reduced compared to the prior art, so that sound having frequency corresponding to the inverse of the cycle time of the updates of applied voltage can be reduced. Furthermore, when the cycle time of the updates of applied voltage is 50 μsec or less, the inverse of the cycle time becomes at least the maximum frequency (20 kHz) which is the general range of hearing for a human, thus the abnormal noise caused by the updates of applied voltage can be reduced significantly.

The present invention preferably comprises a target current calculation part for calculating the target current; a rotational position detection part for detecting the rotational position of the rotor; a current detection part for detecting the actual current flowing through the coil; an applied voltage calculation part for executing the calculations of applied voltage to the coil in a set cycle time, in accordance with the calculated target current, the detected rotational position and the detected actual current; a voltage determination part for determining the applied voltage to the coil in each cycle of the updates of applied voltage until the next calculation of applied voltage is executed, in accordance with the latest calculated applied voltage, the previously calculated applied voltage, and a set cycle time of the updates of applied voltage; and an applied voltage updating part for executing the updates of applied voltage to the coil in accordance with the determined applied voltage and the set cycle time of the updates of applied voltage. Accordingly, in each cycle of the updates until the next calculation of applied voltage is executed, the applied voltage to the coil can be estimated without causing it to differ significantly from a desired value corresponding to the rotational position of the rotor, the target current, and the actual current flowing through the coil; and the applied voltage to the coil can be varied stepwise.

For example, the applied voltage determination part stores the latest calculated applied voltage, the previously calculated applied voltage, and the relationship between the set cycle time of the updates of applied voltage and the applied voltage to the coil until the next calculation of applied voltage is executed. Further, the applied voltage determination part determines the applied voltage in each cycle of the updates of applied voltage until the next calculation of applied voltage is executed, based on the stored relationship and the results of calculations of applied voltage. It is preferred that the updates of the applied voltage to the coil are executed by updating the duty ratio of PWM control signal, and the cycle time of the PWM control signal is equalized to the cycle time of the updates of applied voltage. Accordingly, the present invention can be implemented easily by means of the PWM control.

Moreover, in the present invention, preferably, the applied voltage to the coil in each cycle of the updates of applied voltage until the next calculation of applied voltage is executed is determined in accordance with the latest calculated applied voltage, the last calculated applied voltage before the latest, and the set cycle time of the updates of applied voltage. Accordingly, the calculation load can be reduced.

According to the controller for a brushless motor of the present invention, it is possible to prevent the generation of noise when the motor current is controlled by the updates of applied voltage to the coil.

DESCRIPTION OF THE PREFERRED EMBODIMENTS

Figure 1:
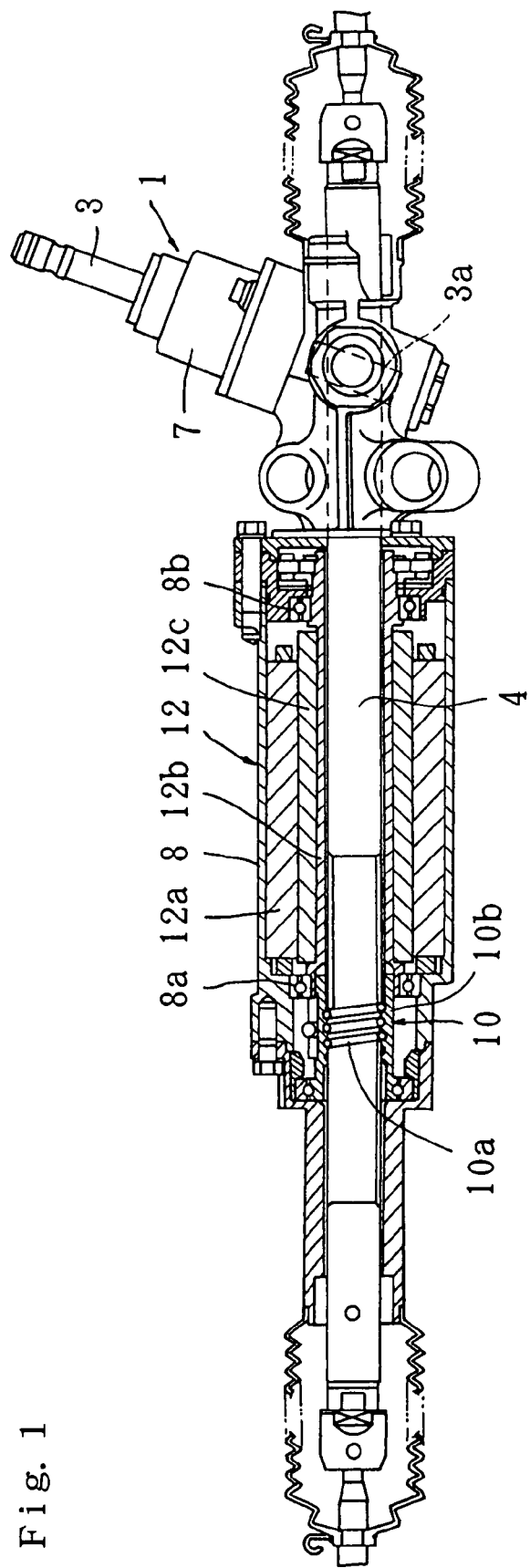
FIG. 1 is a partial cutaway view of an electric power steering apparatus according to an embodiment of the present invention.

A rack and pinion type electric power steering apparatus 1 in a vehicle shown in FIG. 1 comprises a steering shaft 3 which is rotated by steering operation, a pinion 3a which is formed on the steering shaft 3, and a rack 4 which is engaged with the pinion 3a. Both ends of the rack 4 are coupled to vehicle wheels (not shown) for steering. By the rotation of the pinion 3a caused by the steering operation, the rack 4 moves in its longitudinal direction along the width direction of the vehicle, and the steering angle is varied by this movement of the rack 4. In order to apply steering assistance power corresponding to steering torque transmitted by the steering shaft 3, a torque sensor 7 which detects steering torque, a three-phase brushless motor 12 which is driven in accordance with the detected steering torque, and a screw mechanism 10 for transmitting the rotating power output from the motor 12 to the rack 4.

The motor 12 comprises a stator 12a having a coil for U phase, a coil for V phase, and a coil for W phase which are fixed to a housing 8 covering the rack 4; a tubular rotor 12b which is supported rotatably by the housing 8 via bearings 8a and 8b; a magnet 12c which is mounted on the rotor 12b; and a rotational position sensor 35 (see FIG. 2) such as an encoder configuring a rotational position detection part for detecting the rotational position of the rotor 12b; and the rotor 12b surrounds the rack 4. The screw mechanism 10 has a ball screw shaft 10a, which is formed integrally with the periphery of the rack 4, and a ball nut 10b, which is engaged with the ball screw shaft 10a via balls, and the ball nut 10b is coupled to the rotor 12b of the motor 12. Accordingly, the ball nut 10b is rotated by the motor 12, whereby steering assist power is generated along the longitudinal direction of the rack 4 by the rotation of the ball nut 10b.

Figure 2:
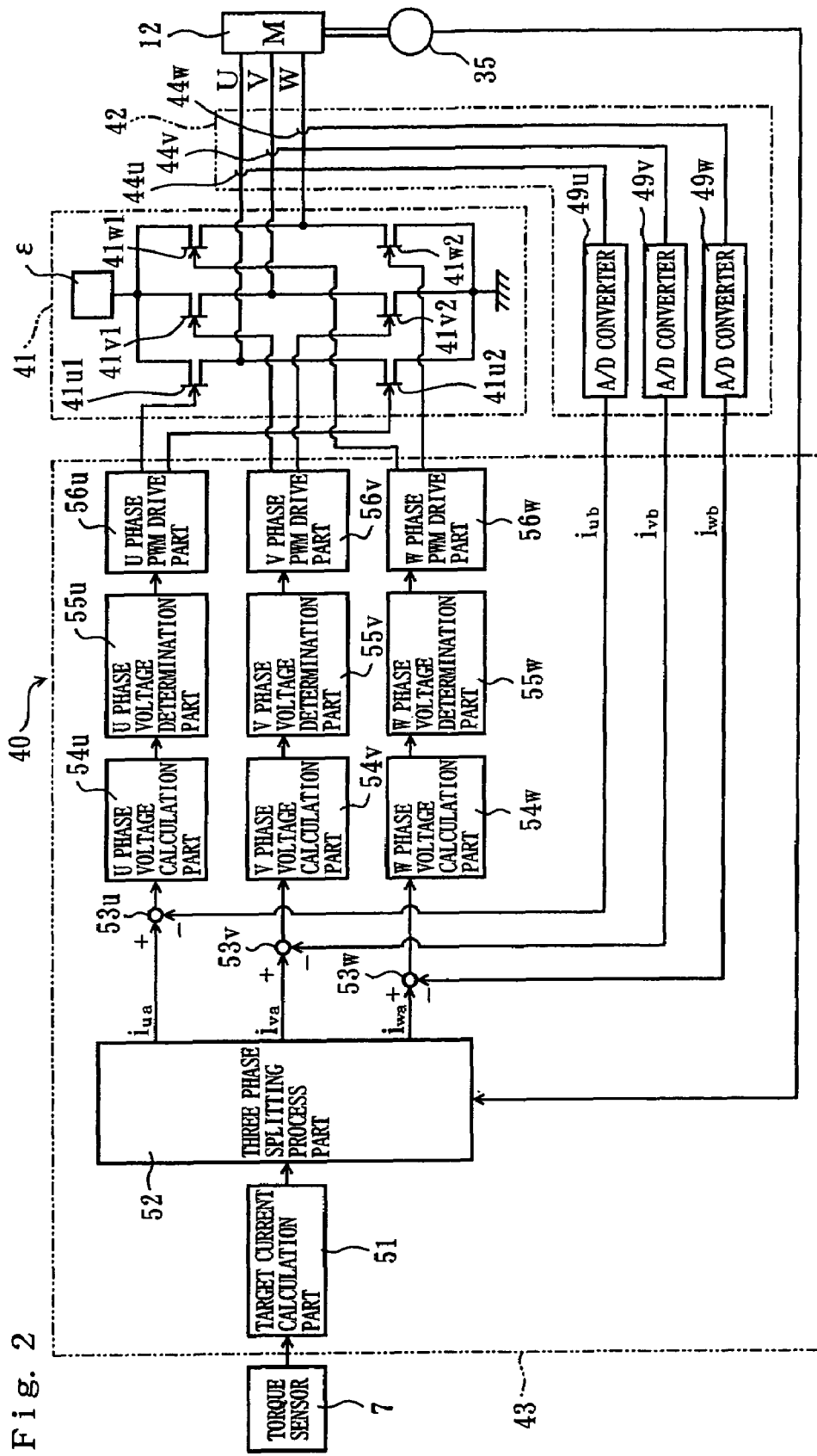
FIG. 2 is an explanatory diagram of the configuration of the controller for a brushless motor according to the embodiment of the present invention.

As shown in FIG. 2, the torque sensor 7 and the motor 12 are connected to a control device 40. The control device 40 comprises a motor driving circuit 41, a current detection part 42, and a signal processing unit 43, and executes updates of applied voltage to each of the coils for U, V, and W phases according to the results of calculations of applied voltage to each of the coils for U, V, and W phases in accordance with the rotational position of the rotor 12b, in order to generate power for rotating the rotor 12b by varying magnetic field generated by the coils for U, V, and W phases of the motor 12.

The motor driving circuit 41 has six FETs 41u1, 41u2, 41v1, 41v2, 41w1, and 41w2 as switching elements for supplying electric power to the coils for U, V, and W phases, with allotting the two FETs to each coil. Each of the FETs 41u1 through 41w2 is opened and closed by PWM control signal output from the signal processing unit 43, so that the updates of applied voltage to each of the coils for U, V, and W phases are executed, and current flowing through each coil is controlled.

The current detection part 42 comprises three current detectors 44u, 44v, and 44w for detecting actual current flowing through the coils for U, V, and W phases; and three A/D converters 49u, 49v, and 49w for A/D conversion of the output signals from the current detectors 44u through 44w and transmitting the converted output signals to the signal processing unit 43.

The signal processing unit 43 can be configured with, for example, a micro computer, and controls each of the FETs 41u1 through 41w2 on the basis of the output signals from the torque sensor 7 and the current detector 42. Therefore, the signal processing unit 43 has a target current calculation part 51 and a three phase splitting process part 52. Further, the signal processing unit 43 has deviation calculation parts 53u, 53v and 53w, voltage calculation parts 54u, 54v, and 54w, voltage determination parts 55u, 55v and 55w, and PWM drive parts 56u, 56v and 56w for each of the coils for U, V, and W phases.

The target current calculation part 51 calculates target current of the motor 12 which corresponds to the steering torque detected by the torque sensor 7, so that steering assist power corresponding to the steering torque is generated. The cycle time of the calculations of the target current can be set to same as in the prior art, for example, it can be 1 msec.

The three phase splitting process part 52 executes calculations of components of the target current for the respective coils for U, V, and W phases, in accordance with the target current calculated by the target current calculation part 51 and the rotational position of the rotor 12b detected by the rotational position sensor 35. The deviation calculation parts 53u, 53v and 53w execute calculations of deviations (iua-iub), (iva-ivb), and (iwa-iwb) between components iua, iva, and iwa of the target current for the respective coils for U, V, and W phases which are calculated by the three phase splitting process part 52 and the actual currents iub, ivb, and iwb flowing through the respective coils for U, V, and W phases which are detected by the current detection part 42. The voltage calculation parts 54u, 54v, and 54w execute calculations of applied voltage to the respective coils for U, V, and W phases which correspond to the deviations (iua-iub), (iva-ivb), and (iwa-iwb) calculated by the deviation calculation parts 53u, 53v, and 53w, in a set cycle time. Specifically, the three phase splitting process part 52, deviation calculation parts 53u, 53v, and 53w, and voltage calculation parts 54u, 54v, and 54w constitute the applied voltage calculation part for executing the calculations of applied voltage to the coils for U, V, and W phases in a set cycle time, in accordance with the calculated target current, the detected rotational position of the rotor 12b, and the detected actual current iub, ivb, and iwb flowing through the coils for U, V, and W phases. The cycle time of the calculations of applied voltage can be set to same as in the prior art, and is 200 μsec in the present embodiment. The signals corresponding to the results of calculations of applied voltage are output to the voltage determination parts 55u, 55v, and 55w.

The voltage determination parts 55u, 55v, and 55w determine applied voltage to the respective coils for U, V, and W phases in each cycle of the updates of applied voltage until the next calculation of applied voltage is executed, in accordance with the latest calculated applied voltage to the respective coils for U, V, and W phases by the applied voltage calculation part, the previously calculated applied voltage, and a set cycle time of the updates of applied voltage. The applied voltage determination parts 55u, 55v, and 55w of the present embodiment store the latest calculated applied voltage to the respective coils for U, V, and W phases by the applied voltage calculation part, the previously calculated applied voltage, and the predetermined relationship between the applied voltage to the respective coils for U, V, and W phases until the next calculation of applied voltage is executed and the set cycle time of the updates of applied voltage, in the form of an arithmetic expression or a table, and determine applied voltage to the respective coils for U, V, and W phases in each cycle of the updates of applied voltage until the next calculation of applied voltage is executed, on the basis of the stored relationship and the calculated applied voltages.

Each of the voltage determination parts 55u, 55v, and 55w of the present embodiment determines a voltage deviation $(E_n-E_{n-1})$ between the latest calculated applied voltage $E_n$ by the applied voltage calculation part and the last calculated applied voltage $E_{n-1}$ before the latest, and determines applied voltage until the next calculation of applied voltage is executed so that it varies stepwise every set cycle time of the updates of applied voltage, with supposing that the above voltage deviation $(E_n-E_{n-1})$ is equivalent to a voltage deviation between the next calculated applied voltage and the latest calculated applied voltage. The cycle time of the updates of applied voltage is set shorter than the cycle time of the calculations of applied voltage in the applied voltage calculation part, and is set to preferably 50 μsec or less. In the present embodiment, the frequency of stepwise variation of the applied voltage per the set cycle time of the updates of applied voltage is set to four. Therefore, the cycle time of the updates of applied voltage is obtained by dividing 200 μsec, which is the cycle time of the calculations of applied voltage in the applied voltage calculation part, by the frequency of stepwise variation, thus the applied voltage varies every 50 μsec which is the cycle time of the updates of applied voltage. In the present embodiment, the value E of the applied voltage in each cycle of the updates of applied voltage until the next calculation of applied voltage is executed is determined as $E=E_n+k(E_n-E_{n-1})/4$, where k (initial value=0) is the frequency of updates per the cycle time of the calculations of applied voltage.

Figure 3:
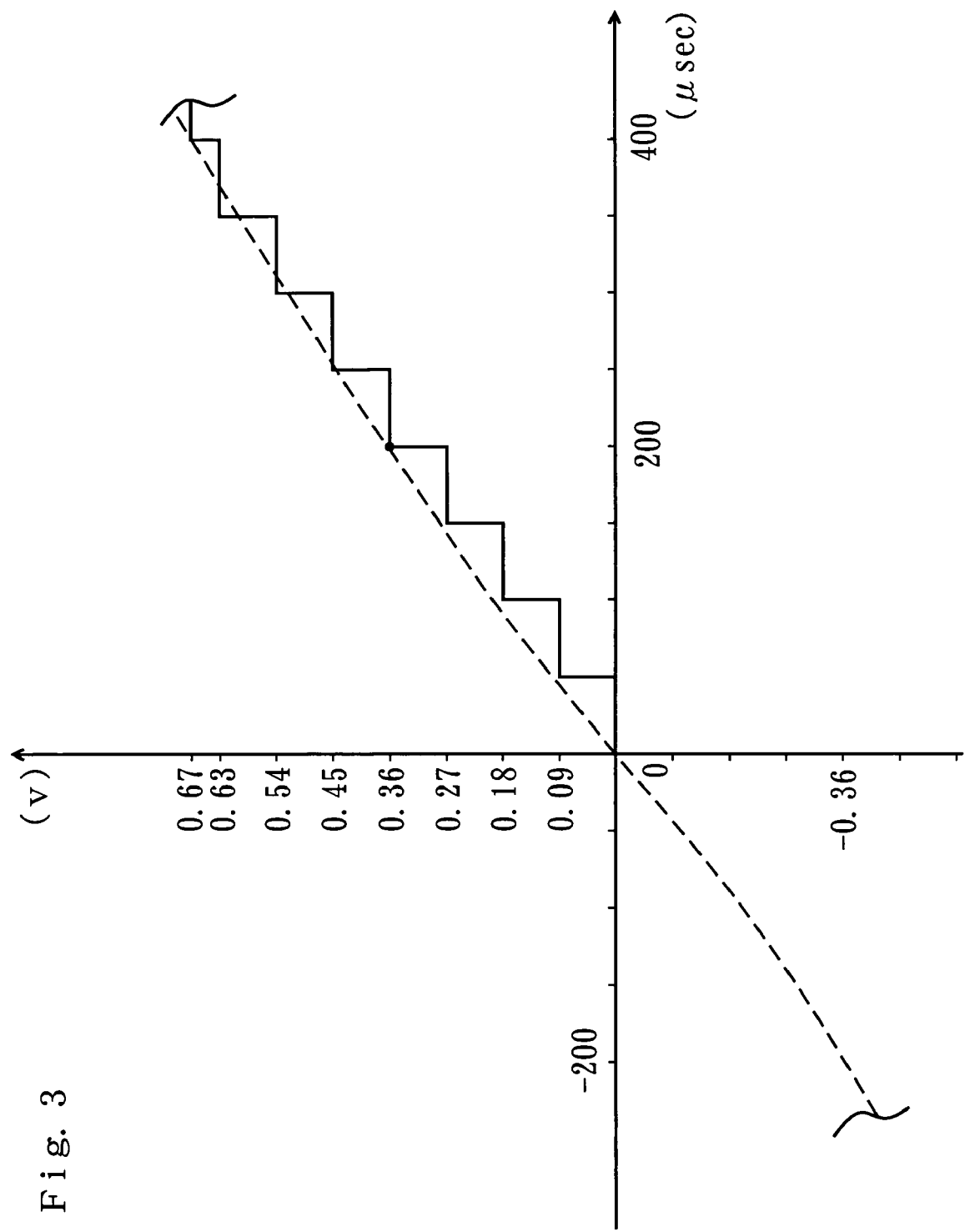
FIG. 3 is an explanatory diagram showing the relationship between the applied voltage to each coil in the brushless motor and time according to the embodiment of the present invention.

FIG. 3 shows an example of the relationship between the applied voltage to each of the coils for U, V, and W phases and time, where the latest calculated applied voltage is zero, and the last calculated applied voltage before the latest is −0.36v. In this case, the respective values of applied voltage to each coil at 0 μsec, 50 μsec, 100 μsec, and 150 μsec until the elapse of 200 μsec, that is, until the next calculation of applied voltage is executed, are 0v, 0.09v, 0.18v, and 0.27v. Moreover, if the value of applied voltage which is calculated when 200 μsec elapse after the start of control is 0.36v, the respective values of applied voltage to each coil at 200 μsec, 250 μsec, 300 μsec, and 350 μsec after the start of control are 0.36v, 0.45v, 0.54v, and 0.63v. In this case, if the value of applied voltage which is calculated when 400 μsec elapse after the start of control is 0.67v, each variation at every 50 μsec until 350 μsec elapse is greater than the variation of applied voltage between at 350 μsec and at 400 μsec after the start of control, but becomes small compared to the variation of applied voltage at every 200 sec in the prior art.

Figure 4:
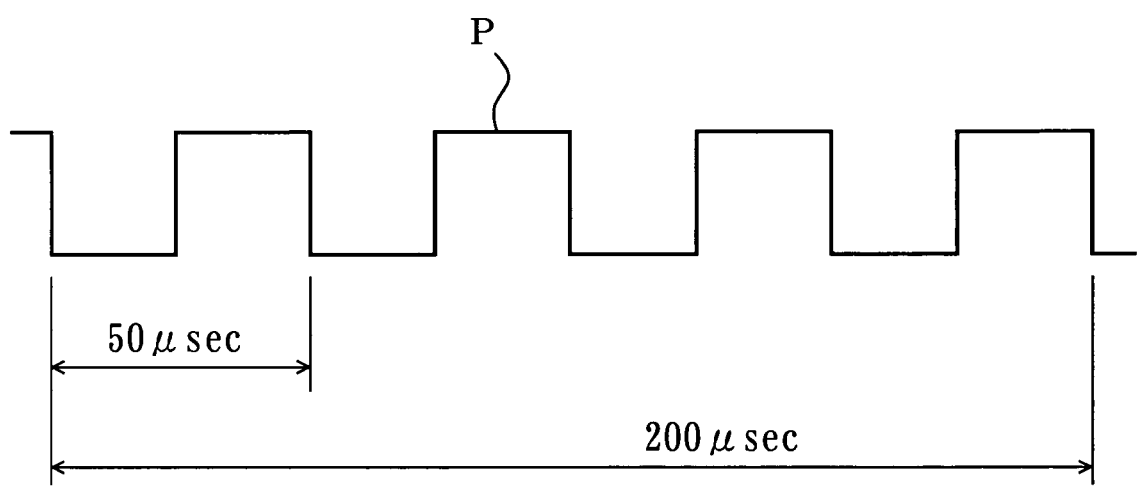
FIG. 4 is a figure showing cycle time of PWM control signal according to the embodiment of the present invention.

The applied voltage which is determined by each of the voltage determination parts 55u, 55v, and 55w is obtained as the duty ratio of the PWM control signal, and the cycle time of the updates of applied voltage corresponds to the cycle time of the PWM control signal. As shown in FIG. 4, the cycle time of the PWM control signal P of the present embodiment is 50 μsec, and the duty ratio of the PWM control signal P is determined every 50 μsec.

Alternatively, the applied voltage to each of the coils can be determined in accordance with the latest calculated applied voltage, the set cycle time of the updates of applied voltage, and not only the last calculated applied voltage before the latest but also the applied voltages calculated before the last calculated applied voltage until the next calculation of applied voltage is executed. For example, the variation rate α of the voltage deviation is determined as a $\alpha=(E_n-E_{n-1})/(E_{n-1}-E_{n-2})$ with using the applied voltage $E_{n-2}$ which is the second before the latest, and the applied voltage E to each of the coils can be determined as $E=E_n+k\alpha(E_n-E_{n-1})/4$ until the next calculation of applied voltage is executed.

Each of the PWM drive parts 56u, 56v, and 56w generates the PWM control signal, the duty ratio of which corresponds to the output value from each of the voltage determination parts 55u, 55v, and 55w; and the PWM control signal is output to the motor driving circuit 41. In the motor driving circuit 41, the updates of applied voltage to each of the coils for U, V, and W phases are executed so that the values of the current flowing through the coils for U, V, and W phases of the motor 12 from the battery ε become the respective components iua, iva, and iwa of the target current by driving the FETs 41u1, 41u2, 41v1, 41v2, 41w1, and 41w2 with the PWM control signal. Accordingly, the PWM drive parts 56u, 56v, and 56w and the motor driving circuit 41 constitutes the applied voltage update part, and the updates of applied voltage to each of the coils for U, V, and W phases are executed in accordance with the applied voltage determined by the voltage determination parts 55u, 55v, and 55w and the cycle time of the updates of applied voltage. The updates of applied voltage to each of the coils for U, V, and W phases are executed by the updates of duty ratio of the PWM control signal wherein the cycle time of the PWM control signal corresponds to the cycle time of the updates of applied voltage. Specifically, the cycle time of the updates of applied voltage is 50 μsec, and is made shorter than 200 μsec which is the cycle time of the calculations of applied voltage corresponding to the rotational position of the rotor 12b.

Figure 5:
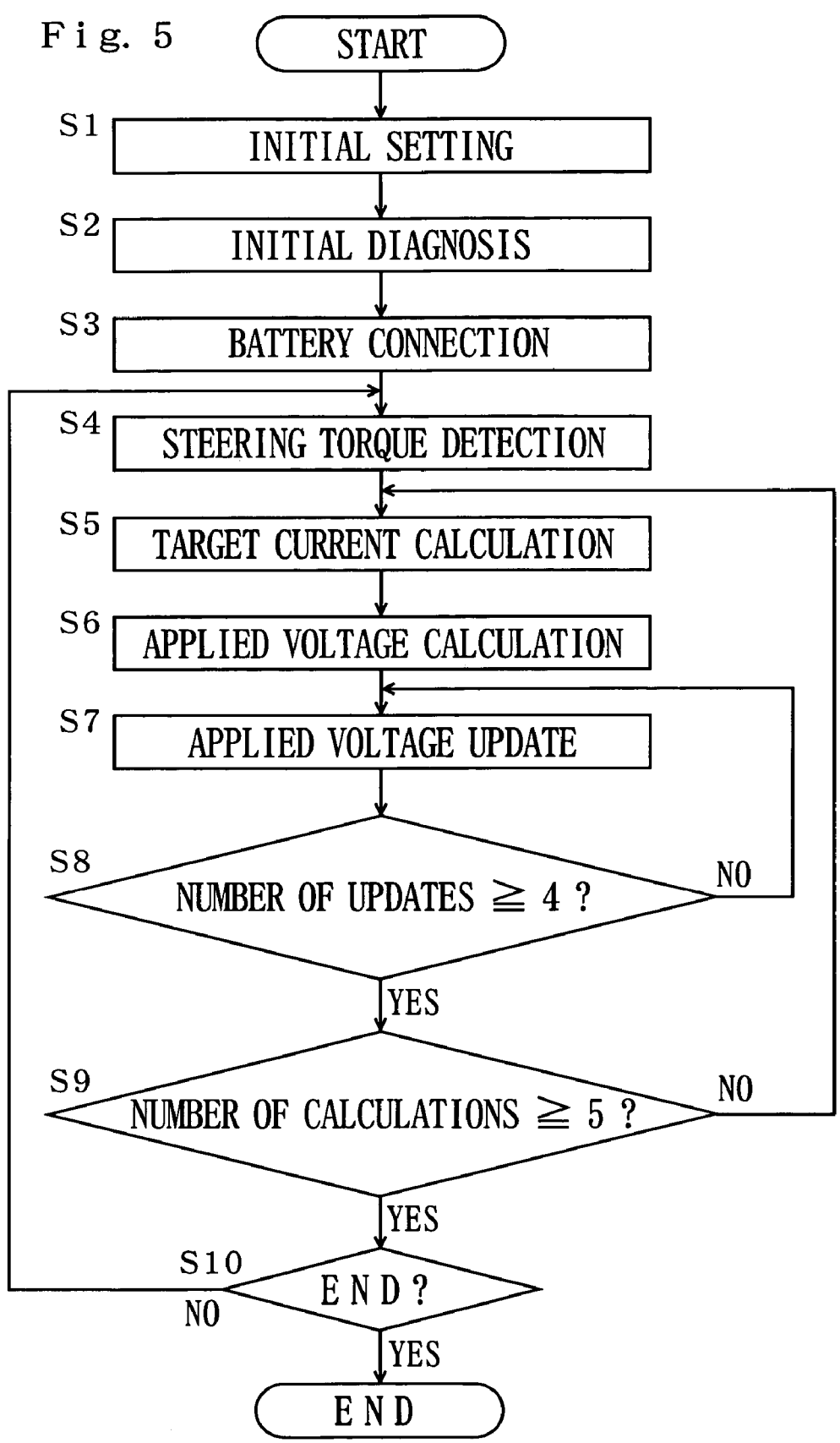
FIG. 5 is a flowchart showing a control procedure performed in the controller for the brushless motor according to the embodiment of the present invention.

The flowchart of FIG. 5 shows a procedure of the control for the brushless motor 12 performed by the control device 40.

First, initial setting is performed when the control is started by, for example, turning the ignition switch of the vehicle (step S1). By this initial setting, the initial values of the target current for each of the coils for U, V, and W phases, which are output from the three phase splitting process part 52, are set to zero, and the initial values of applied voltage, which are deemed to be calculated first before the start of the control, are also set to zero. Next, an initial diagnosis for judging whether or not any abnormal exist in the control system is performed (step S2). This initial diagnosis can be a known one, and the result of this diagnosis is displayed on an appropriate display device (not shown). Next, the battery ε for supplying electric power to the motor 12 is connected to the control device 40 via a relay switch (not shown) (step S3). Then, the steering torque is detected by the torque sensor 7 (step S4), and the target current is calculated based on the detected steering torque (step S5). Next, the calculation of applied voltage to each of the coils for U, V, and W phases is executed in accordance with the calculated target current, the rotational position of the rotor 12b detected by the rotational position sensor 35, and the actual current flowing through each of the coils for U, V, and W phases detected by the current detection part 42 (step S6). Next, the duty ratio of PWM control signal corresponding to the applied voltage is determined in accordance with the latest calculated applied voltage and the last calculated applied voltage before the latest until the next calculation of applied voltage is executed, so that the update of applied voltage to each of the coils for U, V, and W phases is executed every cycle time (50 μsec) of the PWM control signal (step S7). Next, it is judged whether or not the frequency of the updates of applied voltage is equal to the number of times (four) corresponding to the cycle time (200 μsec) for calculating the applied voltage (step S8), if not, the process is returned to the step S7, and if so, it is judged whether or not the frequency of the calculations of applied voltage is equal to the number of times (five) corresponding to the cycle time (1 msec) for calculating the target current (step S9), if not, the process is returned to the step S5, and if so, it is judged whether or not the control is to be ended by judging, for example, whether the ignition switch is on or off (step S10). If the control is not to be ended, the process is returned to the step S4.

According to the above embodiment, the determination loop of applied voltage to each coil of the brushless motor 12 is provided separately from the calculation loop of applied voltage to each coil, and the cycle time of the updates of applied voltage to each coil is made shorter than the cycle time of the calculations of applied voltage, thus the variation of current flowing through each coil according to the cycle time of the updates of applied voltage can be reduced compared to the prior art, whereby sound having frequency corresponding to the inverse of the cycle time of the updates can be reduced. Moreover, applied voltage to each coil is determined in accordance with the latest calculated applied voltage, the previously calculated applied voltage, and the set cycle time of the updates of applied voltage until the next calculation of applied voltage is executed. Therefore, the applied voltage to each coil until the next calculation of applied voltage is executed can be estimated without causing it to differ significantly from a desired value shown in a broken line in FIG. 3, which corresponds to the rotational position of the rotor 12b, the target current, and the actual current flowing through each coil. Accordingly, the applied voltage to each coil can be varied stepwise in accordance with the rotational position of the rotor 12b. Here, the calculation load can be reduced by determining applied voltage so that it varies stepwise every set cycle time of the updates of applied voltage until the next calculation of applied voltage is executed, with supposing that the voltage deviation between the latest calculated applied voltage and the last calculated applied voltage before the latest is equivalent to the voltage deviation between the next calculated applied voltage and the latest calculated applied voltage. Moreover, by making the cycle time of the updates of applied voltage 50 μsec or less, the inverse of the cycle time becomes at least the maximum frequency (20 kHz) which is the general range of hearing for a human, thus the abnormal noise caused by the updates of applied voltage can be reduced significantly.

Figure 6A:
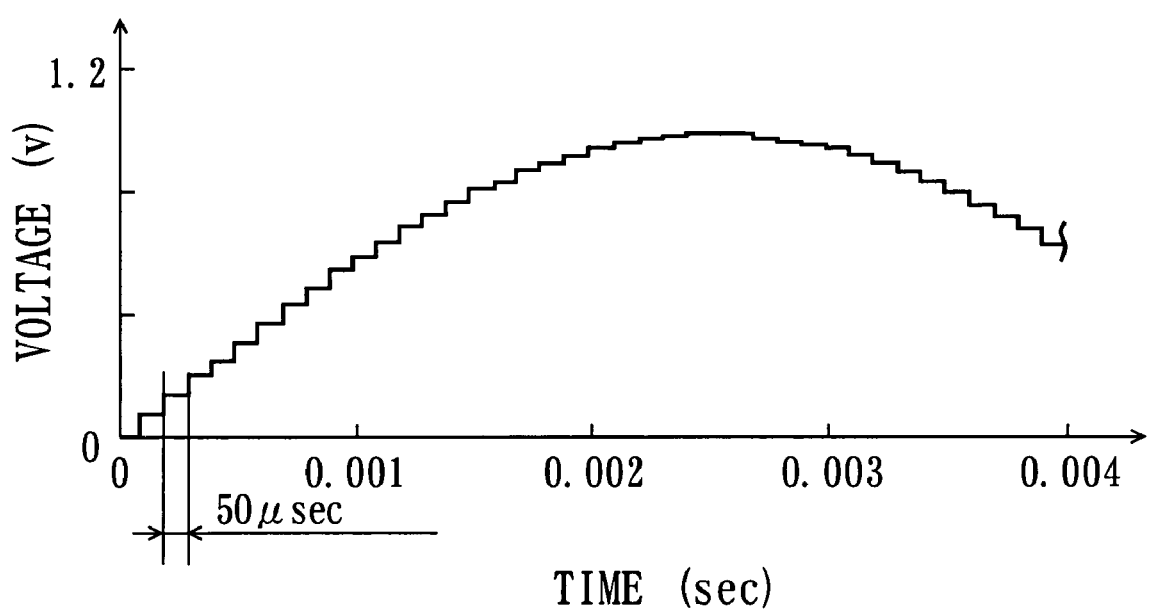
FIG. 6A is a figure showing a relationship between the applied voltage to each coil in the brushless motor and time according to the embodiment of the present invention.
Figure 6B:
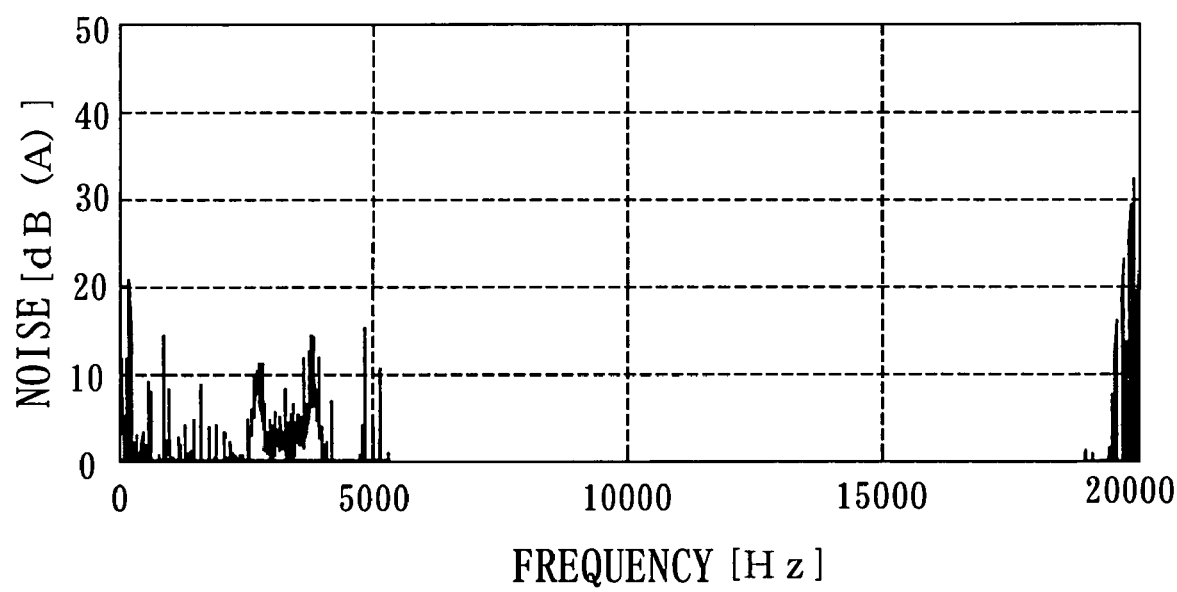
FIG. 6B is a figure showing a relationship between the level of noise generated by the brushless motor and its frequency according to the embodiment of the present invention.
Figure 7A:
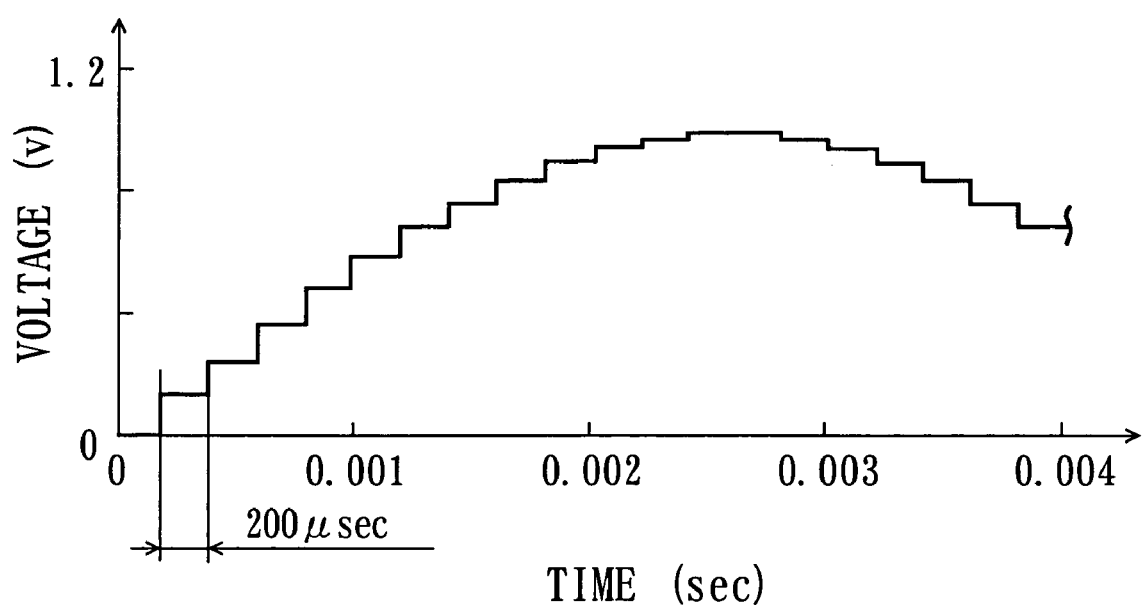
FIG. 7A is a figure showing a relationship between the applied voltage to each coil in a brushless motor and time according to a conventional example.
Figure 7B:
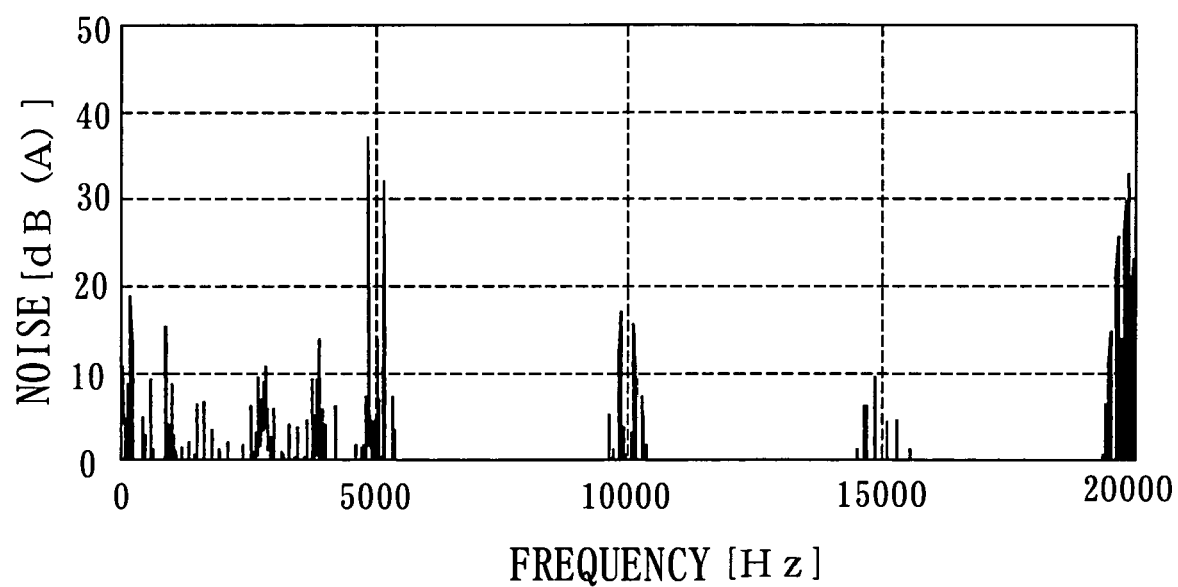
FIG. 7B is a figure showing a relationship between the level of noise generated by the brushless motor and its frequency according to the conventional example.

FIG. 6A shows an example of a relationship between applied voltage and time, when the cycle time of the updates of applied voltage to each of the coils for U, V, and W phases of the brushless motor 12 in the above embodiment is made to be ¼ of 200 μsec which is the cycle time of the calculations of applied voltage. FIG. 6B shows a relationship between the level of noise generated by the brushless motor 12 and its frequency of the present embodiment. FIG. 7A shows a relationship between applied voltage and time in a conventional example, which are measured under the same condition as in FIG. 6A except that the cycle time of the updates of applied voltage to each of the coils for U, V, and W phases of the brushless motor is made equal to the cycle time of the calculations of applied voltage. FIG. 7B shows a relationship between the level of noise generated by the brushless motor and its frequency of the conventional example. The peak of the noise level at frequency of 4500 Hz through 5500 Hz is 14 dB(A) in the above embodiment, while it is 37 dB(A) in the conventional example. An overall value of the noise level at frequency of 4500 Hz through 5500 Hz is 19 dB(A) in the above embodiment, while it is 39 dB(A) in the conventional example. An overall value of the noise level at frequency of 0 Hz through 20000 Hz is 36 dB(A) in the above embodiment, while it is 41 dB(A) in the conventional example. According to the present invention, it has been confirmed that the generation of abnormal noises due to the updates of applied voltage can be reduced. Furthermore, the peak of the noise level at frequency of 20000 Hz is 32 dB(A) in the above embodiment, while it is 31 dB(A) in the conventional example, thus it is confirmed that there is almost no difference therebetween.

The present invention is not limited to the above embodiment. For example, the target current can correspond not only to the detected steering torque but also to speed detected by a speed sensor, or correspond to steering angle detected by a steering angle sensor instead of the steering torque. The purpose of the brushless motor to which the present invention is applied is not limited to the generation of steering assist power. Moreover, the number of phase of the brushless motor is not limited to three. The cycle time of the updates of applied voltage is preferably 50 sec or less, although it is not particularly limited as long as it is shorter than the cycle time of the calculations of applied voltage. Furthermore, the way of calculations of applied voltage to the coil in accordance with the rotational position of the rotor, the target current, and the actual current flowing through the coil is not limited to the above embodiment, it can be executed through, for example, dq conversion in the deviation calculation parts for obtaining the target current.

What is claimed is:

1. A controller for a brushless motor, which executes updates of applied voltage to a coil according to results of calculations of applied voltage to said coil in accordance with rotational position of a rotor, target current, and actual current flowing through said coil, in order to generate power for rotating said rotor by varying magnetic field generated by said coil, wherein the cycle time of said updates of applied voltage is set shorter than the cycle time of said calculations of applied voltage, comprising:

a target current calculation part for calculating the target current;

a rotational position detection part for detecting the rotational position of said rotor;

a current detection part for detecting the actual current flowing through said coil;

an applied voltage calculation part for executing the calculations of applied voltage to said coil in a set cycle time, in accordance with the calculated target current, the detected rotational position, and the detected actual current;

a voltage determination part for determining the applied voltage to the coil in each cycle of said updates of applied voltage until the next calculation of applied voltage is executed, in accordance with the latest calculated applied voltage, the previously calculated applied voltage, and a set cycle time of said updates of applied voltage; and an applied voltage updating part for executing said updates of applied voltage to said coil in accordance with the determined applied voltage and the set cycle time of said updates of applied voltage.

2. The controller for a brushless motor according to claim 1, wherein the applied voltage to said coil in each cycle of said updates of applied voltage until the next calculation of applied voltage is executed is determined in accordance with the latest calculated applied voltage, the last calculated applied voltage before the latest, and the set cycle time of said updates of applied voltage.

3. The controller for a brushless motor according to claim 2, wherein the cycle time of said updates of applied voltage is 50 msec or less.

4. The controller for a brushless motor according to claim 1, wherein the cycle time of said updates of applied voltage is 50 msec or less.

* * * * *